No. 730,698. PATENTED JUNE 9, 1903.
W. H. PRATT.
ELECTRICAL MEASURING INSTRUMENT.
APPLICATION FILED SEPT. 10, 1902.
NO MODEL. 2 SHEETS—SHEET 1.
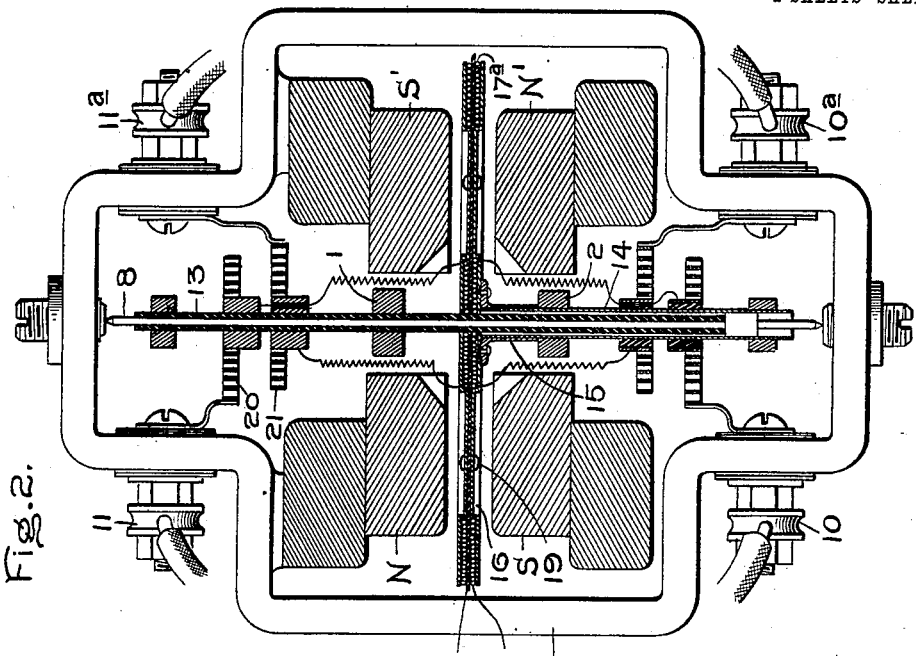
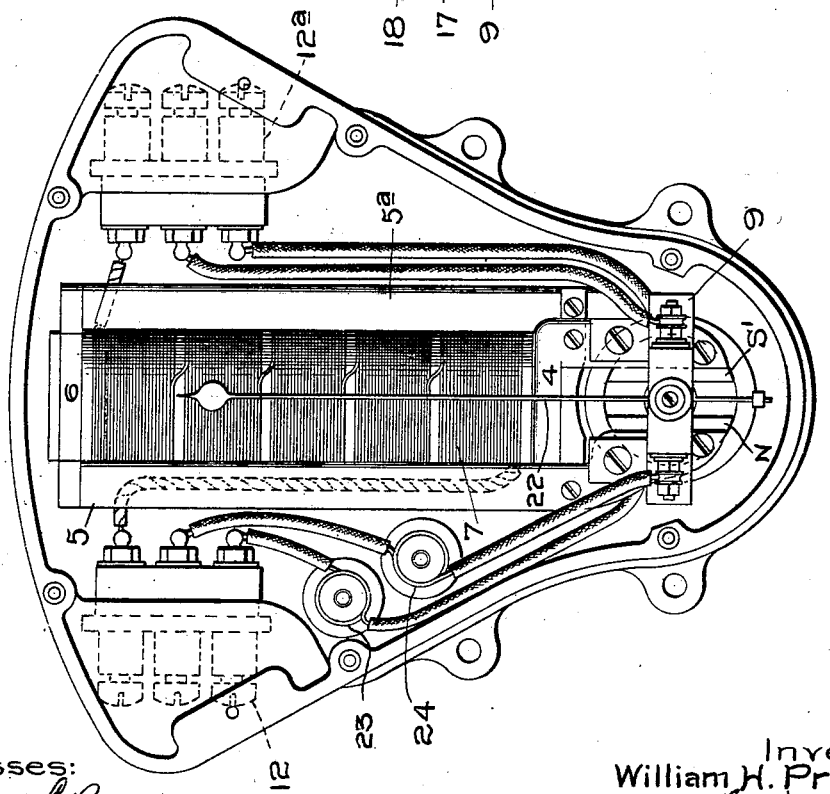
Witnesses: Inventor
William H. Pratt,
by Albert G. Davis
Atty.

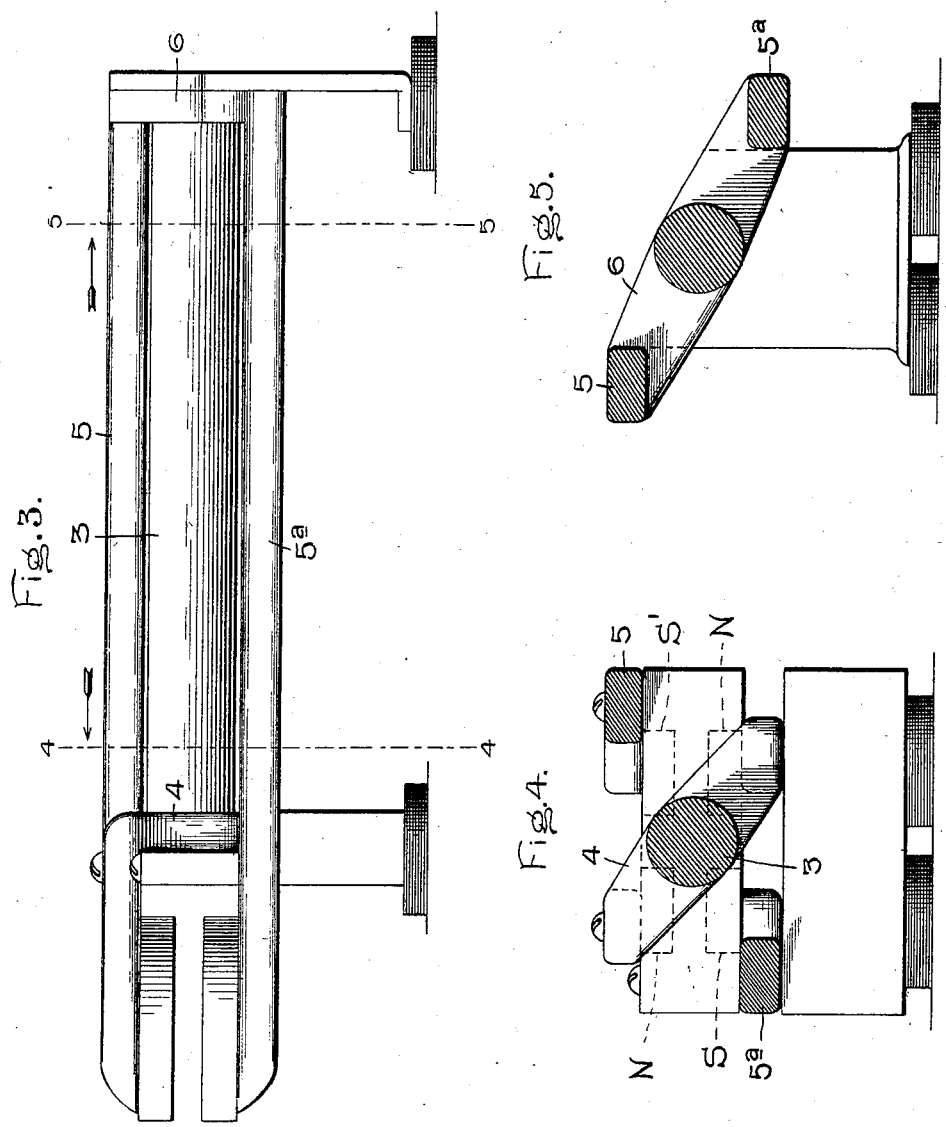

No. 730,698. Patented June 9, 1903.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRICAL MEASURING INSTRUMENT.

SPECIFICATION forming part of Letters Patent No. 730,698, dated June 9, 1903.

Application filed September 10, 1902. Serial No. 122,849. (No model.)

*To all whom it may concern:*

Be it known that I, WILLIAM H. PRATT, a citizen of the United States, residing at Lynn, county of Essex, State of Massachusetts, have invented certain new and useful Improvements in Electrical Measuring Instruments, of which the following is a specification.

This invention relates to electrical measuring instruments of that type in which an electromagnetic field is employed for the moving element. Instruments of this kind are sometimes called "springless" instruments, from the fact that the moving element has its return or zero-seeking force determined by a small body of magnetic metal shifted at an angle to the lines of force by the torque of the moving element.

My invention embodies an instrument of the astatic type, in which the moving element is inclosed in a composite field composed of four pole-pieces arranged in inverse order with respect to the moving element to guard against errors of indication due to stray fields of force. In instruments of this kind as heretofore constructed a plurality of coils to magnetize the field-poles have been employed.

It is one object of my invention to reduce the amount of wire necessary and render the instrument more compact, as well as to improve its appearance, by providing a structure in which the several pole-pieces forming the astatic couple may be polarized by a single magnetizing-coil. To effect this result, I provide a core on which the magnetizing-coil is wound, mounting on one of its ends a magnetic yoke, the ends of which form one member of each astatic pair, and bifurcate the other pole or core end at or near the yoke of the magnet to form the other poles of the astatic couple. This arrangement decreases the amount of wire necessary to polarize the field, renders the construction very compact, and greatly enhances the appearance of the instrument.

My improvements also embody a construction by which a differential indication may be given and two circuits compared. To effect this result, I provide two sets of moving coils, both mounted on the same arbor, but separated from each other by an insulating medium, such as a glass or mica plate, the compound element thus formed moving in the same magnetic field.

The several features of novelty will be hereinafter more fully described and will be definitely indicated in the claims appended to this specification.

In the accompanying drawings, which illustrate my invention, Figure 1 is a plan view, with the cover removed, of an instrument embodying my improvements. Fig. 2 is a sectional view on a magnified scale, showing the relations of the moving element to the field-poles and showing also the mounting of the several parts. Fig. 3 is a side elevation of the magnetic core forming the compound or astatic field. Fig. 4 is a sectional view on a plane indicated by the line 4 4 of Fig. 3 looking in the direction indicated by the arrow, and Fig. 5 is a sectional view on a plane indicated by the line 5 5 of Fig. 3 looking in the direction indicated by the arrow.

I will first describe the magnetic structure.

Measuring instruments as commonly used are provided with permanent magnets. The instrument to which my improvements relate is one with which electromagnets are employed and which affords a much stronger torque and which for that reason is more sensitive, reliable, and accurate than instruments having a weaker field. Instruments of this kind also do not require recalibration, as do permanent-magnet instruments, in which a weakening of the magnets occurs in time. In order, however, to provide a constant zero-seeking torque, notwithstanding possible fluctuations of voltage in the magnetizing-current, these instruments are provided with a magnetic return-piece in which the body of magnetic material employed is saturated at a current density greatly below the range of fluctuation of the magnetizing-current. The return torque, therefore, is constant at any given angular deflection. Such return-pieces are indicated at 1 and 2 in Fig. 2 of the drawings, being constituted in the type shown of a piece of brass or other non-magnetic metal electroplated or otherwise coated with a thin layer of magnetic material—such, for instance, as iron or nickel. The cross-section of the layer is so thin that it is saturated at low current density. One or more of these pieces are mounted on the arbor which carries the movable element, the latter turning in an astatic field formed of two pairs of poles N S and N' S'. Two of these pole-pieces, as N N', are connected to core extensions of the core 3 of the electromagnet, being screwed or otherwise secured to parallel extensions or arms of an iron yoke 4, mounted on the core. The other pole-pieces S S' are similarly secured to extensions 5 5ª of an iron yoke 6, which is screwed to the other end of the core. The coil 7 is slipped on the core and the yoke 4 then driven in place. The arbor of the moving element comprises a rod 8, mounted in jewel bearings in the usual manner, the bearings being supported in a non-magnetic frame 9, carried on the field-poles. Insulated binding-posts 10 10ª 11 11ª are mounted on the frame and connected with suitable copper binding-posts 12 12ª, &c., supported in the instrument-casing, a pair of terminals being provided for a magnetizing-coil and for each of the coil systems of the compound moving element. An insulated sleeve 13 is secured on the arbor 8, on the lower end of which is carried a metal sleeve 14, which supports a spider 15, which is fastened in an aluminium or other metal disk 16, carrying two coils of light wire nesting in a pressed recess in the sides of the disk. These coils are indicated at 17 17ª. A similar disk is arranged just above the disk 16 and is separated therefrom by a good insulating material, such as glass or mica, as indicated at 18. Hard-rubber or other insulating rivets 19 clamp the two armature-disks firmly together. The leads from the lower armature-coils are carried to the inner end of the flexible spiral conductors, as indicated in the drawings, which connect with the binding-posts 10 10ª. The moving coils of the upper armature connect through suitable leads with flexible conducting-spirals 20 21, which similarly communicate with binding-posts 11 11ª. Thus the instrument may be connected with two circuits which are to be compared, the terminals of one circuit leading to the binding-posts 11 11ª and of the other to the binding-posts 10 10ª. The needle or pointer 22 is fastened to the arbor which carries the movable element and a scale-plate, provided, as usual, with instruments of this kind.

23 24 represent resistances within the casing, which may be used when the instrument is employed as a voltmeter. When employed as an ammeter, suitable shunts may be used.

The magnet-coil 7 is connected to a circuit of suitable voltage for which it is designed—say one hundred and twenty volts. Any fluctuation of voltage on the circuit does not interfere with the accuracy of the instrument, since the magnetic return-pieces 1 2 are saturated for much weaker currents than normally flow, and consequently when the voltage declines or rises the moment of the zero-seeking force is changed due to the magnetic return-piece, and the change of field-magnet strength affects alike both the return-piece and the movable element. The pole-pieces may be chamfered or otherwise shaped so as to produce a symmetrical field about the armature. It will thus be seen that the moving element and the magnetic return piece or pieces are mounted in the same field and that this field is astatic and is polarized by a single core. Any fluctuation of polarizing magnetism due to change of voltage in the magnetizing-coil affects the same component of the torque on the moving coil and on the magnetic return-piece alike.

While I have shown and described my invention as applied to an instrument in which the magnetic field is produced by an electromagnet, yet it is evident that it is equally well suited to an instrument in which the magnetic field is due to a permanent magnet.

What I claim as new, and desire to secure by Letters Patent of the United States, is—

1. An electrical measuring instrument having a magnetic return-piece for its movable element, provided with a plurality of pairs of poles forming an astatic system, all polarized by a single core.

2. An electrical measuring instrument having its movable element and a magnetic return-piece to provide a zero-seeking force both mounted within an astatic field formed by a plurality of poles polarized by a single core, and a coil for magnetizing the core.

3. A differential electrical measuring instrument comprising two opposing movable coil systems, a common arbor upon which they are mounted, and a common magnetic field embracing both coil systems.

4. An electrical measuring instrument comprising a double armature, each having its own coil system, an insulating-spacer between the two systems, and a common magnetic field embracing the two.

5. An electrical measuring instrument comprising an electromagnetic field, a common core provided with a plurality of pairs of pole-pieces forming said field, a movable element, and a magnetic return-piece mounted within said field.

6. An astatic measuring instrument comprising a field-magnet having a pair of extensions for each pole of the magnet juxtaposed to form an astatic field, and a movable element mounted in said field.

In witness whereof I have hereunto set my hand this 6th day of September, 1902.

WILLIAM H. PRATT.

Witnesses:
DUGALD McK. McKILLOP,
JOHN J. WALKER.